United States Patent [19]

Nybakken

[11] 4,273,177
[45] Jun. 16, 1981

[54] PNEUMATIC RADIAL TIRE WITH FOLDED PLY BREAKER HAVING SOFT CUSHION SURROUNDING BREAKER EDGE

[75] Inventor: George H. Nybakken, Prospect, Conn.

[73] Assignee: Uniroyal, Inc., New York, N.Y.

[21] Appl. No.: 136,182

[22] Filed: Mar. 31, 1980

[51] Int. Cl.³ .............................................. B60C 9/20
[52] U.S. Cl. ............................... 152/360; 152/361 FP; 152/361 DM; 152/374; 152/209 R
[58] Field of Search ............... 152/330 R, 360, 361 R, 152/361 FP, 361 DM, 374, 209 R

[56] References Cited

U.S. PATENT DOCUMENTS

| | | | |
|---|---|---|---|
| 1,769,694 | 7/1930 | Jenkinson | 152/360 |
| 2,982,328 | 5/1961 | Emanueli et al. | 152/361 R |
| 3,404,721 | 10/1968 | Massoubre | 152/361 FP |
| 3,598,165 | 8/1971 | Hanus | 152/361 R |
| 3,881,538 | 5/1975 | Mirtain | 152/361 FP |
| 3,945,421 | 3/1976 | Poque et al. | 152/361 FP |
| 4,034,791 | 7/1977 | Mirtain | 152/361 FP |
| 4,062,393 | 12/1977 | Bertrand | 152/360 R |

FOREIGN PATENT DOCUMENTS

| | | | |
|---|---|---|---|
| 864707 | 9/1978 | Belgium . | |
| 831320 | 10/1968 | Canada | 152/361 FP |
| 2021051 | 11/1979 | United Kingdom | 152/330 R |

Primary Examiner—John T. Goolkasian
Assistant Examiner—Lois E. Boland
Attorney, Agent, or Firm—Charles A. Blank

[57] ABSTRACT

A pneumatic radial tire has a two-ply tread reinforcing breaker wth cords of filamentary material. The breaker plies are of unequal widths and arranged symmetrically with respect to the median circumferential or equatorial plane of the tire, the overall width of the breaker being substantially the width of the overlying tread. In the region of each shoulder of the tread, the edges of one ply are folded back on themselves forming superimposed two-ply regions and three-ply regions enclosing the edges of a narrow, non-folded ply. Surrounding each two-ply region of the folded ply is a cushion rubber which is softer than the tread or breaker skimcoat rubbers. The breaker construction substantially eliminates breaker edge separation, resulting in a more durable radial tire which can be recapped to provide further service.

10 Claims, 4 Drawing Figures

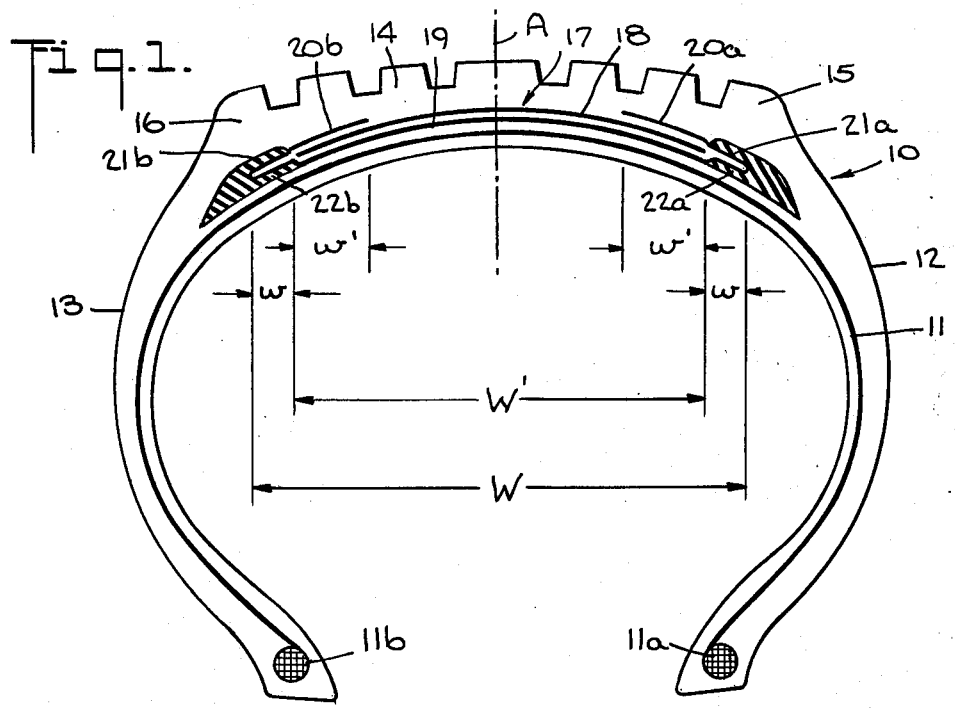
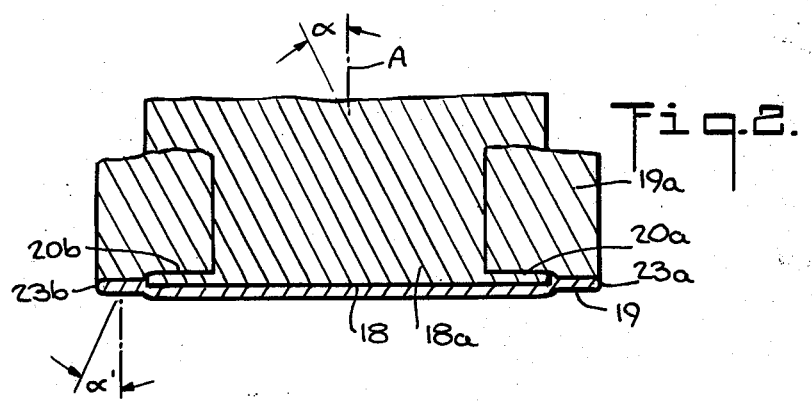
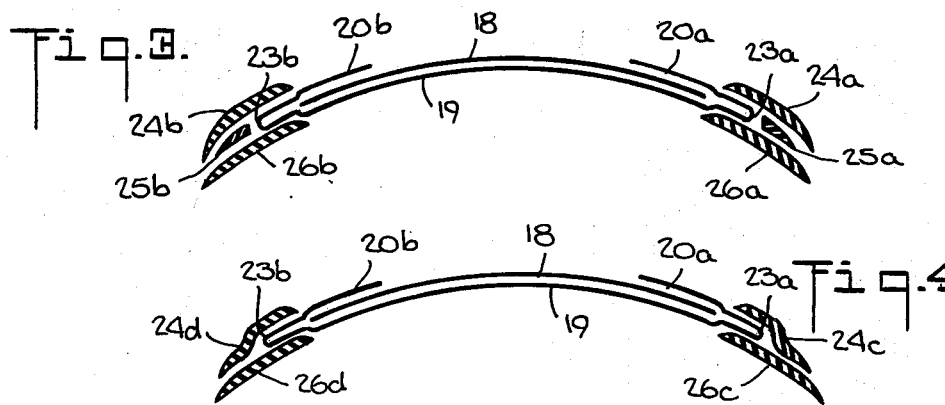
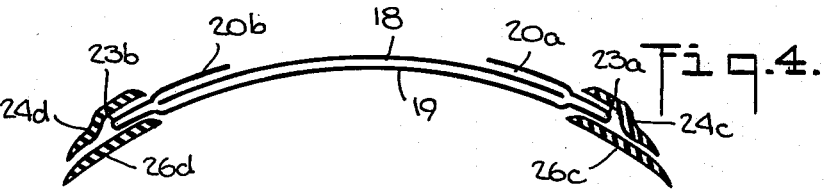

PNEUMATIC RADIAL TIRE WITH FOLDED PLY BREAKER HAVING SOFT CUSHION SURROUNDING BREAKER EDGE

This invention relates to pneumatic radial tires of the type having a tread reinforcement comprising a first breaker ply and a second breaker ply whose marginal portions are folded over the first breaker ply.

Folded breaker tread reinforcement for radial tires is well known and its advantages for high speed performance, good vehicle handling and resistance to breaker edge separation are also well known. A folded breaker tread reinforcement consisting of two plies with a wide ply folded back over itself and enclosing the edges of a narrower, non-folded ply has the advantage of keeping exposed ply edges away from the critical shoulder area.

Folded ply tread reinforcement with two ply layers in the shoulder region is disclosed in U.S. Pat. No. 3,945,421. The folded ply encloses lateral strips as well as the edges of the non-folded ply, thereby reducing the effective reinforcement in the superimposed region by radially separating the plies in the superimposed region with the lateral strips. The two ply layers in the shoulder regions disclosed in U.S. Pat. No. 4,034,791 are folded plies separate from two non-folded plies which form the main body of the tread reinforcement. Without the lap joint continuity of the folded strips to both non-folded plies, the effectiveness of the breaker assembly reinforcement in the shoulder areas is reduced, thus limiting the advantages of folded breaker tread reinforcement.

It is an object of the invention, therefore, to provide a pneumatic radial tire having an efficient tread reinforcement which avoids one or more of the disadvantages of such prior tires.

It is another object of the invention to provide a pneumatic radial tire which is particularly immune to separations either internally between breaker plies or externally between the breaker and surrounding tread rubber and radial carcass reinforcement plies.

It is a further object of the invention to provide a pneumatic radial tire having a tread reinforcement which derives the most reinforcement from a folded breaker construction while using cord material in an efficient manner and which results in a substantially thin shoulder region.

In accordance with the invention, a pneumatic radial tire comprises a carcass including a pair of beads and at least one ply having cords extending from one bead to the other and disposed substantially radially of the tire. The tire also includes a reinforcing breaker extending substantially circumferentially of the tire over the carcass. The tire also includes tread and sidewall portions of elastomeric material over the carcass. The reinforcing breaker comprises an unfolded inner first ply of cord material coated with elastomeric material and an outer second ply of cord material coated with elastomeric material and folded to form two opposed flap portions which fold over on the outer ply and on the inner ply. The edges of the inner ply are spaced apart from the folded edges of the outer ply so that the outer ply has folded two-layer regions. The tire also includes a cushion portion of elastomeric material above, at the edge and below each two-layer region of the outer ply substantially separating each two-layer region from the adjacent radial carcass ply, tread and sidewall portions. The cushion portions of elastomeric material are softer than the tread portion and softer than the elastomeric material coating the inner and outer plies of the breaker.

For a better understanding of the present invention, together with other and further objects thereof, reference is made to the following description, taken in connection with the accompanying drawings, and its scope will be pointed at in the appended claims.

Referring now to the drawings:

FIG. 1 is a view of a pneumatic radial tire constructed in accordance with the present invention.

FIG. 2 is a diagrammatic fragmentary plan view of the two-ply structure utilized in the breaker construction in a tire according to the present invention;

FIG. 3 is a sectional view of an embodiment of the breaker structure in conjunction with cushion rubber pieces to be utilized in a tire according to the present invention; and FIG. 4 is a sectional view of a second embodiment of the breaker structure in conjunction with cushion rubber pieces to be utilized in a tire according to the present invention.

In the tire of the present invention, the folded over marginal regions of the wider ply folded back on the wider ply result in two layers of plies at the extremes of the belt structure and these same folded over marginal regions also overlap the inner, non-folded ply resulting in an adjacent region with three layers of plies. The length of this overlap preferably is of certain dimensions so as not to reduce the reinforcement efficiency of the breaker structure. The most efficient folded breaker has no cut edges and appears in a sectional view like a flattened hose with just two layers of plies across its entire width. To take on the flattened toroidal shape necessary for a tire tread reinforcing structure, the ideal folded breaker would have to be woven from a single cord. To eliminate the complication of manufacture of this breaker and allow for fabrication from a flat sheet of cord fabric, the flattened hose type structure can be cut in any number of places across its width and an overlap joint provided to allow cord tension transfer across the joint. For a folded breaker structure consisting of two plies, the lap joints result in two regions where three layers of plies are present. To obtain an efficient overlap joint which allows substantial cord tension transfer with the shortest overlap, the cords in each ply of the joint preferably should be parallel to each other with only the rubber skimcoat between the layers. With the above criteria for an efficient joint, the overlap distance preferably should be at least fifty cord diameters in the cord direction and need not be longer than one hundred cord diameters with one hundred cord diameters preferred. For a cord with a diameter of 0.030 inch (0.76 mm) at a cord angle of 22° with respect to the equatorial or meridian plane, the preferred overlap distance measured perpendicular to the meridian plane is 1.12 inches (28.5 mm). Any extra strips or layers of material placed internal to the structure reduce the efficiency of the breaker assembly by reducing the coupling between plies and complicates the manufacture of the tire. To provide the highest breaker efficiency by achieving maximum reinforcement from the least amount of cord fabric, the cords of both plies should be at equal and opposite angles to the meridian plane and the cords of both plies should have substantially the same modulus of elasticity.

To keep the three layers of plies present at the lap joints of a two ply folded breaker structure out of the critical shoulder area, the edges of the inner, non-folded ply are separated from the folded edges by a distance of from 5–15%, preferably 7–12%, of the total overall width of the breaker structure as measured from one folded edge to the other folded edge. The two ply, folded extremes of the belt structure allow maximum reinforcement at the edges while keeping the less efficient overlap joint out of this area which coincides with the critical shoulder area. Overlap joints meeting the above criteria effectively eliminate the possibility of separations internal to the folded breaker structure.

The two layers of plies adjacent to the fold can be effectively isolated from the surrounding tread rubber and carcass ply reinforcement by the use of cushion rubber with the total radial thickness of the two ply layers plus cushion rubber being only 10–35% thicker than the adjacent three ply layers. The two layer edge region of the breaker structure with accompanying soft cushions effectively resists separations between the folded breaker structure and surrounding areas while keeping the critical shoulder area as thin as possible for cooler internal running temperatures necessary for extended durability without separations.

Referring now to FIGS. 1 and 2 of the drawings, the radial tire 10 according to the present invention comprises, for example, a substantially radial monoply carcass 11 having cords extending to a pair of beads 11a, 11b, the sidewalls 12 and 13 overlying the respective lateral regions of the carcass, a tread 14 overlying the crown region of the carcass and adjoining the sidewalls 12 and 13 at their radially outwardmost regions, i.e. the shoulders 15 and 16, and a breaker structure 17 with cushions 21a, 22a and 21b, 22b interposed between the crown region of the carcass and the tread for reinforcing the latter.

The breaker construction 17 consists of two layers or plies comprising a narrow, unfolded ply 18 and a wide, folded ply 19 of rubberized parallel reinforcing cords 18a and 19a preferably in the form of generally round cables of non-metallic, textile material such as aramid. The cords 18a and 19a preferably are symmetrically oriented at respective equal but opposite substantial bias angles of $\alpha$ and $\alpha'$ to the median equatorial plane A, the said bias angles ranging from 18° to 26° in the finished or cured tire. The wider of the two plies 19 is folded tightly back on itself in a radial outwardly direction to form folded flaps 20a and 20b of equal width $w+w'$. The radii of curvature 23a and 23b of the folded flaps of ply 19 are approximately equal to the thickness of the rubber sheet in which the reinforcing cords 18a and 19a are embedded. As a consequence the portion of the folded flaps of the wide ply which overlap the narrow, unfolded ply are situated at a radial distance which is greater than the radial distance of that portion of the folded flap that does not overlap the lateral edge of the narrow, unfolded ply. The overall width of the breaker structure W, i.e., the distance between the folded edges of the wider ply, preferably should be substantially the width of the tread. The distance between the folded edge of the wide ply and the lateral edge of the narrow ply w is from 5–15% of the total width W with a preferred range of 7–12%. Thus, the width of the inner, non-folded belt W' is from 85–95% of the total width W with a preferred range of 88–93%. The folded portions of the wide ply or flaps 20a and 20b also partially overlap the inner ply 19 a distance w' determined by the diameter of the reinforcing cords 18a and 19a. The overlap distance along the cord direction, i.e., an angle $\alpha$ to the median equatorial plane A, preferably is at least fifty cord diameters and no longer than one hundred cord diameters with one hundred cord diameters being the preferred length. However, manufacturing tolerances of ±15% are to be taken into consideration.

The cushion rubbers 21a, 22a and 21b and 22b surround each two layer region of width w adjacent to the fold, effectively isolating this region of the breaker structure from the tread rubber in the shoulders 15 and 16, the sidewall rubber in the sidewalls 12 and 13 and the underlying carcass reinforcing plies 11. The modulus of elasticity of the cushion rubber preferably is less than the modulus of rubbers used in the tread and in the breaker skimcoat. The modulus referred to is the Dynamic Complex Modulus measured in $kg/cm^2$ at 11 Hz, 1% strain at 21° C. using a Rheo-Vibron apparatus manufactured by Toyo Industries, Japan. The modulus of the cushion rubber preferably is 45–55, while the modulus of the rubber used in the tread preferably is 110–130, the modulus of the rubber used in the breaker skimcoat preferably is 75–100, and the modulus of the rubber used in the carcass plies preferably is 55–60. The Shore A hardness of the cushion rubber preferably is in the range of 40–55, preferably 50–55, and the cushion rubber is softer than the tread portion which preferably has a Shore A hardness of 60, and the cushion rubber is softer than the breaker skimcoat rubber which preferably has a Shore A hardness of 65. The hardness of the carcass skimcoat rubber preferably is 52.

The geometry of the cushion pieces is such that the cushion rubber is between the fold area and carcass reinforcement, is laterally outside and adjacent to the edge of the fold area, and is radially outward of the fold area. In the FIG. 3 breaker and cushion structure, the folded breaker structure is as discussed above while the cushion rubber is divided into three pieces at each fold region prior to vulcanization. The radially innermost flat pieces 26a and 26b lie between the fold area and the carcass reinforcement plies. The triangular pieces 25a and 25b lie at a laterally adjacent location just outside the fold. The flat pieces 24a and 24b are radially outermost and lie between the tread rubber and the fold area while also covering the aforementioned triangular pieces.

The breaker and cushion structure of FIG. 4 consists of the aforementioned breaker structure with its accompanying cushion rubber divided into two pieces at each fold region prior to vulcanization. The radially innermost flat pieces 26c and 26d lie between the fold area and the carcass reinforcement plies. The radially outermost flat pieces 24c and 24d lie between the fold area and the tread rubber and also come radially in to enclose the edges of the fold and join with the radially innermost pieces.

The cushion pieces shown in FIG. 3 and FIG. 4 are examples of the geometry of the cushion pieces practical for conventional radial tire manufacture. The present invention is not meant to be limited in the geometry of the cushion pieces so long as the cushion rubber pieces surround the two layer region of the aforementioned breaker assembly adjacent to the fold with at least a thickness of 0.04 inch (1 mm).

Tires having a monoply radial textile carcass and two-ply tread reinforcing breakers made in accordance with the present invention are characterized by unexpectedly high resistance to breaker ply separations as demonstrated by their performance using test wheels.

Tires were made in accordance with my instructions in FR78-14 size having a monoply, polyester cord carcass and two breakers with cords of Kevlar (registered trademark of E. I. duPont de Nemours and Co. for aramid cords) made with a folded breaker structure similar to FIG. 1. but not having an all soft cushion rubber in accordance with the invention with a cured tread rubber hardness of 60 Shore A and a cured sidewall rubber hardness of 52 Shore A. The cured cushion rubber hardness of the portions corresponding to pieces 26a, 26b of FIG. 3 was 52 Shore A, the cured cushion rubber hardness of the portions corresponding to pieces 24a, 25a and 24b, 25b of FIG. 3 was 65 Shore A, the cured breaker skimcoat rubber hardness was 65 Shore A, and the cured carcass skimcoat rubber hardness was 52 Shore A. The tires had a high resistance to separations internal to the breaker structure and did not fail in 100 hours of a stepped up load test with a load increasing from 1280 pounds to 2662 pounds, an inflation pressure of 24 pounds per square inch plus build-up pressure, and a speed of 50 miles per hour. The tires ran an additional 7.5 hours on a stepped up speed test at speeds increasing from 50 to 125 miles per hour, at an inflation pressure of 30 pounds per square inch plus build-up and a load of 1280 pounds. The tires also did not fail after a stepped durability test of 7 hours consisting of loads from 1280 pounds to 2375 pounds, inflation pressure from 24 to 48 pounds per square inch and speeds of from 70 miles per hour to 100 miles per hour.

A radial tire having a conventional folded breaker structure consisting of an outer folded layer with flaps folded over an unfolded inner layer, with the breaker made of steel cords, but without cushions, failed after 6.5 hours on the stepped durability test due to separation internal to the breaker. A conventional steel-belted radial tire with unfolded breaker layers and without cushions failed after 3.8 hours on the stepped durability test due to separation between the unfolded breaker plies.

A tire with the breaker structure plus cushion rubbers and made in accordance with the present invention has a high resistance to separations external to the breaker structure between the breaker structure and surrounding shoulder areas of tread rubber, sidewall rubber and carcass reinforcement plies as well as a high resistance to separations internal to the breaker structure. Tires were made in accordance with my instructions in a P215/65R390 size having a monoply, polyester cord carcass and either two breakers of Kevlar cord or a folded breaker of Kevlar cord and an unfolded breaker of steel cord assembled with cushion rubber in accordance with the present invention. These combinations with a harder cushion rubber with a Shore A hardness of 65 and a softer cushion rubber with a Shore hardness of 54 were tested on a 67 inch test wheel under the severe conditions of 48 pounds per square inch running inflation pressure, 2313 pounds load and 100 miles per hour speed and were tested until failure. Group 1 tires featured soft cushion rubber under the fold area between the fold area and the carcass ply and hard cushion rubber at the edge of the fold and over the fold area between the fold area and the shoulder tread rubber. These tires were essentially of the same construction as the FR78-14 tires discussed previously. Group 2 tires featured the reverse combination with hard cushion rubber under the fold area and soft cushion rubber at the edge and over the fold area. Group 3 tires featured the soft rubber as cushions at all three locations. All tires failed during the accelerated durability testing from a separation external to the breaker structure. Group 1 tires failed in 1.6 and 0.5 hours, Group 2 tires failed in 1.3, 1.2 and 1.4 hours, and Group 3 tires failed in 2.2, 3.4, 5.6 and 6.1 hours.

The results of the accelerated durability testing show that standard monoply radial tires having the folded breaker construction and soft rubber cushions completely surrounding the fold area in accordance with this invention have outstanding durability with respect to separations external to the breaker structure as well as separations internal to the breaker structure.

This invention is not limited to the use of any particular type of elastomer as long as the elastomers used in the different component stocks meet two fundamental requirements. First, all component stocks which are used to make the tire must have the degree of mutual compatibility required in the fabrication of a sound and durable tire. Second, the soft cushion stock must be softer than the tread or breaker skimcoat compound.

One skilled in the art will recognize the mechanical properties needed in radial tires and how they can be obtained by standard compounding methods using the commercially available unsaturated hydrocarbon elastomers, fillers, plasticizers, antidegradants and curatives. The principal unsaturated hydrocarbon elastomers used in tires include natural rubber, styrene-butadiene copolymers (SBR) and polybutadiene.

For example, the tread stock may contain SBR or a blend of SBR and polybutadiene (100/0 to 50/50) compounded with 55 to 75 phr (parts by weight per 100 parts by weight of rubber hydrocarbon) high abrasion carbon black such as ASTM N-330, 25 to 40 phr aromatic extender oil, 1 to 3 phr tackifier resin, 1 to 3 phr antidegradant, 1.5-2.5 phr sulfur and 0.5 to 1.25 phr of an accelerator which is conveniently a derivative of mercapto-benzothiazole, such as N-cyclohexyl-2-benzothiazyl sulfenamide. The proportions of sulfur and accelerator are adjusted to obtain the desired state of cure.

In the breaker stock it is common practice to use natural rubber sometimes blended with 10 to 25% cis-polybutadiene with 0 to 5 phr extender oil and 50 to 60 phr high structure carbon black such as ASTM N-351, 1 to 3 phr antidegradant such as an alkyl substituted N-phenyl-p-phenylenediamine, sulfur and accelerator as in the tread except that more sulfur (3 to 4 phr) may be used to obtain the desired modulus. A composition of this type was also used as a hard cushion in the tires tested as described previously.

A suitable tire sidewall can be made with equal parts by weight of natural rubber and cis-polybutadiene compounded with 5 to 10 phr extender oil, 40 to 50 phr carbon black such as ASTM N-550 or ASTM N-326, at least 3 phr of an alkyl N phenyl-p-phenylene diamine, and curatives similar to the tread.

The soft cushion stock is preferably made with natural rubber or a blend with cis-polybutadiene (100/0–60/40) compounded with 5 to 10 phr oil, 35 to 45 phr carbon black such as ASTM N-326, ASTM N-330 and ASTM N-351, 1 to 2 phr antidegradant and an accelerator-sulfur combination similar to the tread but adjusted to produce the specified modulus.

The carcass stock can be made from natural rubber or a blend with SBR (100/0–60/40) compounded with 5 to 10 phr naphthenic type extender oil, 45–55 phr ASTM N-660 carbon black, 0.5 to 1.0 phr of a non-staining antidegradant such as polyalkylated phenol with sulfur and accelerator.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. A pneumatic radial tire comprising:
   a carcass including a pair of beads and at least one ply having cords extending from one bead to the other and disposed substantially radially of the tire;
   a reinforcing breaker extending substantially circumferentially of the tire over said carcass; and
   tread and sidewall portions of elastomeric material over said carcass;
   said reinforcing breaker comprising an unfolded inner first ply of cord material coated with elastomeric material and an outer second ply of cord material coated with elastomeric material and folded to form two opposed flap portions which fold over on said outer ply and on said inner ply, the edges of said inner ply being spaced apart from the folded edges of said outer ply so that said outer ply has folded two-layer regions; and
   a cushion portion of elastomeric material above, at the edge, and below each two-layer region of said outer ply substantially separating said each two-layer region from the adjacent radial carcass ply, tread and sidewall portions, said cushion portions of elastomeric material being softer than said tread portion and softer than said elastomeric material coating said inner and outer plies of said breaker.

2. A tire in accordance with claim 1 in which said cushion portions comprise elastomeric material having a Shore A hardness in the range of 40 to 55, inclusive.

3. A tire in accordance with claim 1 in which each of said cushion portions in the regions over said folded two-layer regions of said outer ply has a thickness of at least 0.04 inch.

4. A tire in accordance with claim 1 in which each of said flap portions of said outer ply overlaps said inner ply with the cords of said flap portions being parallel to the cords of said inner ply and with the overlap of each flap portion over said inner ply being in the range of fifty to one hundred cord diameters, inclusive, in the cord direction.

5. A tire in accordance with claim 4 in which said overlap of each flap portion over said inner ply is one hundred cord diameters in the cord direction.

6. A tire in accordance with claim 1 in which said edges of said inner ply are separated from said folded edges of said folded outer ply by a distance in the range of 5 to 15 percent, inclusive, of the overall width of said breaker as measured from one folded edge to the other folded edge of said outer ply.

7. A tire in accordance with claim 6 in which said distance is in the range of 7 to 13 percent, inslusive, of the overall width of said breaker.

8. A tire in accordance with claim 1 in which the total radial thickness of each two-layer region of said outer ply and of said cushion portions at said each two-layer region of said outer ply is in the range of 10 to 35 percent, inclusive, thicker than adjacent three layer regions of said flap portions, said inner ply and said outer ply.

9. A tire in accordance with claim 1 in which said folded breaker ply is of aramid.

10. A tire in accordance with claim 3 in which each of said flap portions of said outer ply overlaps said inner ply with the cords of said flap portions being parallel to the cords of said inner ply and with the overlap of each flap portion over said inner ply being in the range of fifty to one hundred cord diameters, inclusive, in the cord direction and in which said edges of said inner ply are separated from said folded edges of said folded outer ply by a distance in the range of 5 to 15 percent, inclusive, of the overall width of said breaker as measured from one folded edge to the other edge of said outer ply.

* * * * *